(12) United States Patent
Shibuya et al.

(10) Patent No.: US 11,137,303 B2
(45) Date of Patent: Oct. 5, 2021

(54) TORQUE DETECTION DEVICE

(71) Applicant: NTN CORPORATION, Osaka (JP)

(72) Inventors: Yusuke Shibuya, Iwata (JP); Takashi Koike, Iwata (JP); Yasuyuki Fukushima, Iwata (JP)

(73) Assignee: NTN CORPORATION, Osaka (JP)

( * ) Notice: Subject to any disclaimer, the term of this patent is extended or adjusted under 35 U.S.C. 154(b) by 1 day.

(21) Appl. No.: 16/649,092

(22) PCT Filed: Sep. 20, 2018

(86) PCT No.: PCT/JP2018/034833
§ 371 (c)(1),
(2) Date: Mar. 19, 2020

(87) PCT Pub. No.: WO2019/059284
PCT Pub. Date: Mar. 28, 2019

(65) Prior Publication Data
US 2020/0292400 A1 Sep. 17, 2020

(30) Foreign Application Priority Data
Sep. 22, 2017 (JP) .............................. JP2017-182796

(51) Int. Cl.
*G01L 3/10* (2006.01)
(52) U.S. Cl.
CPC .................................... *G01L 3/104* (2013.01)
(58) Field of Classification Search
CPC .............................. F16C 41/007; G01L 3/104
(Continued)

(56) References Cited

U.S. PATENT DOCUMENTS 2,785,573 A * 3/1957 Bentley ................. G01C 19/20
74/5.6 R
6,038,933 A 3/2000 Meyer
(Continued)

FOREIGN PATENT DOCUMENTS

EP 891923 A2 1/1999
EP 2607223 A1 6/2013
(Continued)

OTHER PUBLICATIONS

International Search Report issued in corresponding International Patent Application No. PCT/JP2018/034833, dated Nov. 6, 2018, with English translation.
(Continued)

*Primary Examiner* — Octavia Hollington
(74) *Attorney, Agent, or Firm* — McDermott Will & Emery LLP

(57) ABSTRACT

A torque detection device includes an inner ring, a middle ring, an outer ring, a first beam, a second beam, a magnetic target, and a magnetic sensor. The first beam is composed of an elastic member extending in a radial direction so as to couple the inner ring and the middle ring together. The second beam is composed of an elastic member extending in a radial direction so as to couple the middle ring to the outer ring together. The magnetic target is fixed to the inner ring and the magnetic sensor is fixed to the middle ring such that the magnetic target and the magnetic sensor face each other. Torque acting on the inner ring or the outer ring is calculated according to how an amount of magnetism sensed by the magnetic sensor changes.

6 Claims, 10 Drawing Sheets

(58) Field of Classification Search
USPC .................................................. 73/862.331
See application file for complete search history.

(56) References Cited

U.S. PATENT DOCUMENTS

| | | | |
|---|---|---|---|
| 6,550,346 B2* | 4/2003 | Gombert | G01L 5/166 |
| | | | 250/208.6 |
| 6,694,828 B1* | 2/2004 | Nicot | B62D 1/16 |
| | | | 180/422 |
| 8,707,822 B2* | 4/2014 | Luo | F16F 15/18 |
| | | | 74/574.1 |
| 2010/0005907 A1 | 1/2010 | Kato et al. | |
| 2015/0069175 A1 | 3/2015 | Schank | |
| 2016/0178396 A1 | 6/2016 | Kolbenschlag | |
| 2018/0209860 A1 | 7/2018 | Okada et al. | |

FOREIGN PATENT DOCUMENTS

| | | |
|---|---|---|
| JP | H11-30555 A | 2/1999 |
| JP | 2008-298531 A | 12/2008 |
| JP | 2009-288198 A | 12/2009 |
| JP | 2013-517973 A | 5/2013 |
| WO | 2017/018319 A1 | 2/2017 |

OTHER PUBLICATIONS

European Office Action issued in corresponding European Patent Application No. 18859457.6, dated May 27, 2021.

\* cited by examiner

TORQUE DETECTION DEVICE

CROSS-REFERENCE OF RELATED APPLICATIONS

This application is the U.S. National Phase under 35 U.S.C. § 371 of International Patent Application No. PCT/JP2018/034833, filed on Sep. 20, 2018, which in turn claims the benefit of Japanese Patent Application No. 2017-182796, filed on Sep. 22, 2017, the entire disclosures of which Applications are incorporated by reference herein.

TECHNICAL FIELD

The present invention relates to a torque detection device, and more particularly to a torque detection device used for measuring torque acting on a rotation shaft or the like.

BACKGROUND ART

For example, Japanese Patent Laying-Open No. 2009-288198 (PTL 1) discloses a torque measuring apparatus which measures torque acting on a rotation shaft or the like. The torque measuring apparatus includes a main flexure part as a main part where flexure occurs and an auxiliary flexure part as an auxiliary part where flexure occurs. The main flexure part is a part displaced mainly in a direction about a rotation axis of inner and outer rings in response to torque generated as the inner and outer rings rotate. The auxiliary flexure part has an annular shape extending from one end of the main flexure part in a direction in which the inner and outer rings rotate, that is, in the circumferential direction of the main flexure part. The auxiliary flexure part removes a displacement component in a direction other than the direction about the rotation axis of the main flexure part. The auxiliary flexure part's action as described above suppresses flexure of the main flexure part in a direction other than a direction in which the main flexure part should flex and displace.

CITATION LIST

Patent Literature

PTL 1: Japanese Patent Laying-Open No. 2009-288198

SUMMARY OF INVENTION

Technical Problem

In the torque measuring apparatus disclosed in Japanese Patent Application Laying-Open No. 2009-288198, by bonding one or more (for example, four) pairs of strain gauges to the main flexure part, a sensor output voltage signal can be obtained from how each strain gauge's electrical resistance value changes. From the output voltage signal, torque is measured with high accuracy and high sensitivity. However, the torque measuring apparatus disclosed in Japanese Patent Application Laying-Open No. 2009-288198 obtains how electric resistance values of each pair's strain gauges vary from distortion caused by the main flexure part's expansion and contraction, and therefrom calculates the sensor output voltage signal and furthermore performs calculation for torque. This requires the torque measuring apparatus to perform a complicated process to perform an operation on values detected from a plurality of strain gauges. That is, it is believed that the torque measuring apparatus has a complicated processing circuit.

The present invention has been made in view of the above issue, and an object of the present invention is to provide a torque detection device capable of simply detecting only torque in a direction about a rotation axis even when composite torque is input.

Solution to Problem

A torque detection device of the present invention includes an inner ring, a middle ring, an outer ring, a first beam, a second beam, a magnetic target, and a magnetic sensor. The first beam is composed of an elastic member extending in a radial direction so as to couple the inner ring and the middle ring. The second beam is composed of an elastic member extending in a radial direction so as to couple the middle ring and the outer ring. The magnetic target and the magnetic sensor are fixed to one and the other, respectively, of the inner and middle rings or one and the other, respectively, of the middle and outer rings so as to face each other. Torque acting on the inner ring or the outer ring is calculated according to how an amount of magnetism sensed by the magnetic sensor changes.

Advantageous Effects of Invention

According to the present invention, torque acting on an inner ring or an outer ring is calculated according to how an amount of magnetism sensed by a magnetic sensor changes. This can dispense with such a complicated process as calculating a sensor output voltage signal from how electric resistance values of a plurality of strain gauges bonded to a main flexure part change, and can detect only torque in a direction about a rotation axis, as necessary, through a simple process.

DESCRIPTION OF EMBODIMENTS

Hereinafter, embodiments of the present invention will be described with reference to the drawings.

First Embodiment

Figure 1:
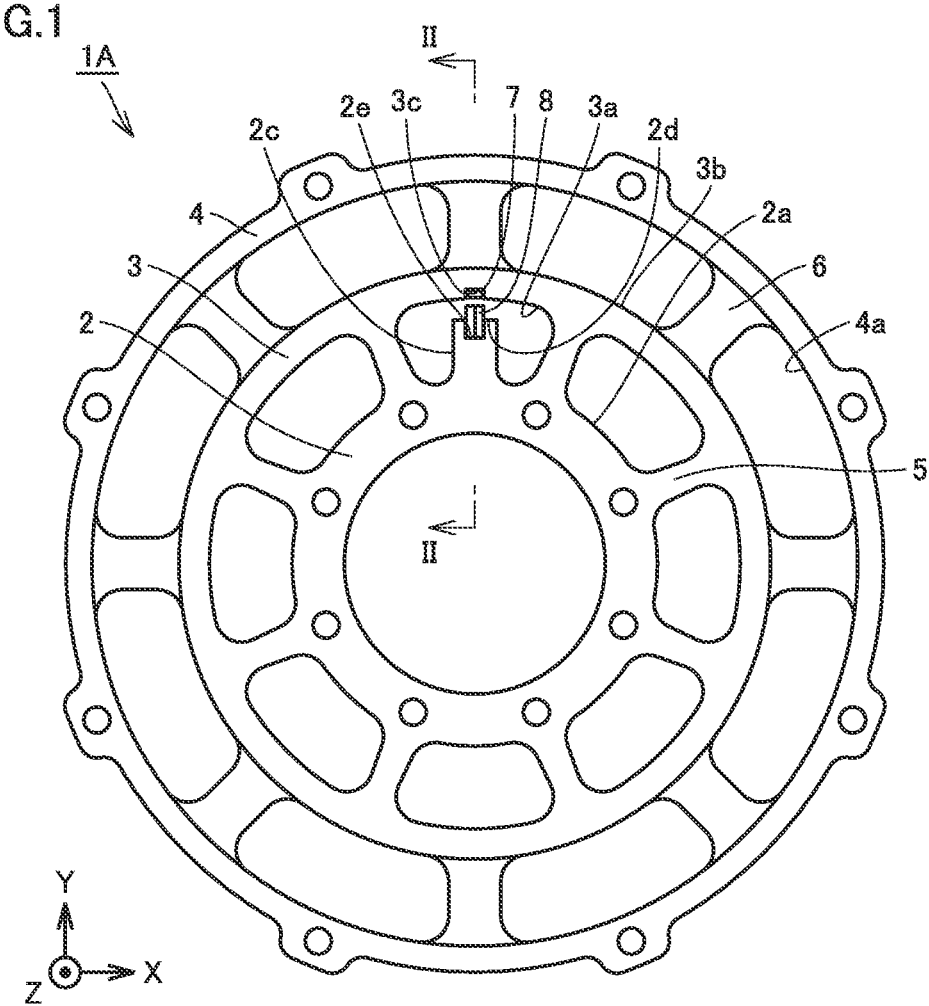
FIG. 1 is a schematic plan view of a torque detection device according to a first embodiment.
Figure 2:
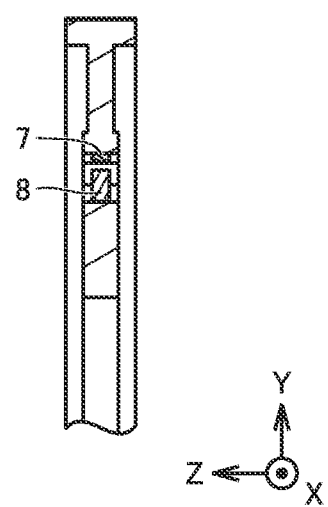
FIG. 2 is a schematic cross section of a portion along a line II-II indicated in FIG. 1.
Figure 3:
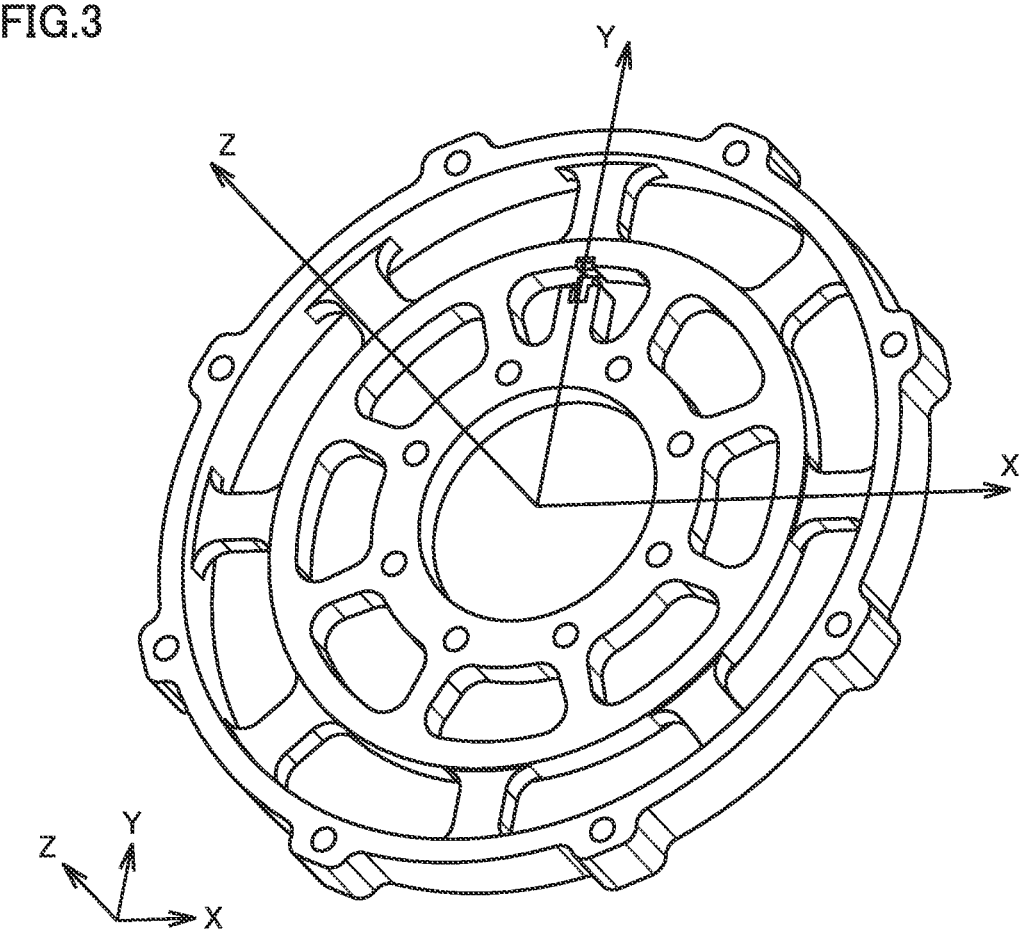
FIG. 3 is a schematic perspective view for more clearly showing the X direction, the Y direction, and the Z direction in FIGS. 1 and 2 as the X axis, the Y axis, and the Z axis, respectively.

Initially, a torque detection device of the present embodiment will be described with reference to FIGS. 1 to 8. For convenience for description, an X direction, a Y direction, and a Z direction are introduced. FIG. 1 is a schematic plan view of a torque detection device according to the present embodiment. FIG. 2 is a schematic cross section of a portion along a line II-II indicated in FIG. 1. FIG. 3 is a schematic perspective view for more clearly showing the X direction, the Y direction, and the Z direction in FIGS. 1 and 2 as the X axis, the Y axis, and the Z axis, respectively. Referring to FIGS. 1, 2 and 3, a torque detection device 1A of the present embodiment mainly includes an inner ring 2, a middle ring 3, an outer ring 4, a first beam 5, a second beam 6, a magnetic sensor 7 and a magnetic target 8.

Inner ring 2 is an annular portion disposed on the innermost side in plan view. The inner side of inner ring 2 is a circular hollow portion. For example, a rotation shaft of a motor can be inserted into the circular hollow portion of inner ring 2. Middle ring 3 is an annular portion disposed on a radially outer side of inner ring 2 and spaced from inner ring 2. Outer ring 4 is an annular portion disposed on a radially outer side of middle ring 3 and spaced from inner ring 2. An annular object which rotates using, for example, a motor's rotational force is fitted in and fixed to the radially outer surface of outer ring 4. Since each of these members has an annular shape, torque detection device 1A generally has a substantially circular planar shape. Note, however, that inner ring 2 and outer ring 4 may have a radially inner side and a radially outer side, respectively, changed in shape, as appropriate, depending on the shape of the rotation shaft fixed to inner ring 2 and the shape of the object fixed to outer ring 4. Accordingly, torque detection device 1A as a whole may have a planar shape changed, as desired, such as a quadrangle.

First beam 5 extends in the radial direction of the circular shapes of inner and middle rings 2 and 3 so as to couple inner and middle rings 2 and 3. More specifically, inner ring 2 includes a radially outer surface 2a as a radially outermost surface thereof, and middle ring 3 includes a radially inner surface 3a as a radially innermost surface thereof. First beam 5 extends in the radial direction of the circular shapes of inner and middle rings 2 and 3 so as to couple radially outer surface 2a and radially inner surface 3a. A plurality of first beams 5 are disposed equidistantly in the circumferential direction of the circular shapes, and eight first beams 5 are disposed as an example in FIG. 1. First beam 5 is fixed to inner ring 2 and middle ring 3. In other words, first beam 5 never moves freely with respect to inner ring 2 and middle ring 3.

Second beam 6 extends in the radial direction of the circular shapes of middle and outer rings 3 and 4 so as to couple middle and outer rings 3 and 4. More specifically, middle ring 3 includes a radially outer surface 3b as a radially outermost surface thereof, and outer ring 4 includes a radially inner surface 4a as a radially innermost surface thereof. Second beam 6 extends in the radial direction of the circular shapes of middle and outer rings 3 and 4 so as to couple radially outer surface 3b and radially inner surface 4a. A plurality of second beams 6 are disposed equidistantly in the circumferential direction of the circular shapes, and eight second beams 6 are disposed as an example in FIG. 1. Second beam 6 is fixed to middle ring 3 and outer ring 4. In other words, second beam 6 never moves freely with respect to middle ring 3 and outer ring 4.

As shown in FIG. 1, first and second beams 5 and 6 are preferably disposed so as not to be aligned in a straight line in plan view. In other words, in FIG. 1, second beams 6 are disposed as pairs of beams extending in directions substantially matching the X and Y directions, respectively, whereas first beams 5 are not as such, and instead each disposed to extend in a direction having a fixed angle with respect to the X and Y directions.

Magnetic target 8 is fixed to inner ring 2 in FIGS. 1 and 2. More specifically, inner ring 2 has a protrusion 2c formed at a portion of radially outer surface 2a of inner ring 2 toward a radially outer side. Protrusion 2c is formed on one radially outer surface 2a of radially outer surfaces 2a divided into eight sections in the circumferential direction by eight first beams 5, for example. A flat surface recess 2e is further formed on a surface of a tip of protrusion 2c, that is, a flat surface on the radially outermost side thereof, i.e., a flat tip surface 2d. Flat surface recess 2e is formed toward a radially inner side. Magnetic target 8 is disposed so as to be fixed to flat surface recess 2e. Magnetic target 8 is a mechanism which generates a magnetic field, as will be described hereinafter.

Magnetic sensor 7 is fixed to middle ring 3 in FIGS. 1 and 2. More specifically, middle ring 3 has a recess 3c formed at a portion of radially inner surface 3a of middle ring 3 toward a radially outer side. Magnetic sensor 7 is disposed so as to be fixed to recess 3c. Magnetic sensor 7 is directly fixed to recess 3c. Note that magnetic sensor 7 may be mounted on a printed circuit board (not shown), and the printed circuit board may be fixed on a flat surface (not shown) provided on a portion of a surface of radially inner surface 3a.

Magnetic sensor 7 is a mechanism which senses a magnetic field generated by magnetic target 8. In order to sense the magnetic field, magnetic target 8 and magnetic sensor 7 face each other in the radial direction. Torque detection device 1A having the above-described configuration calculates torque acting on inner ring 2 according to an amount of magnetism sensed by magnetic sensor 7. Hereinafter, a configuration of such a torque detection device 1A will be described in more detail with reference to FIGS. 4 to 8.

Figure 4:
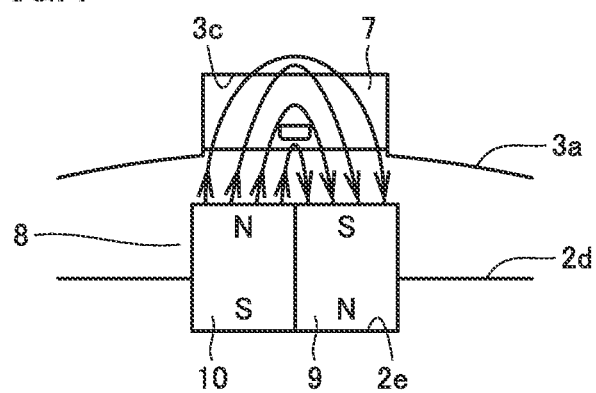
FIG. 4 is a schematic diagram showing in more detail an example of a configuration of a magnetic target 8 and a magnetic sensor 7 shown in FIGS. 1 to 3.

FIG. 4 is a schematic diagram showing in more detail an example of a configuration of magnetic target 8 and magnetic sensor 7 shown in FIGS. 1 to 3. Referring to FIG. 4, magnetic target 8 includes two permanent magnets 9 and 10. Permanent magnets 9 and 10 are each magnetized so as to have a pair of north and south poles in a longitudinal direction, that is, a vertical direction as seen in FIG. 4. These two permanent magnets 9 and 10 are adjacently disposed and thus bonded together. Herein, the two permanent magnets 9 and 10 are preferably aligned in a direction in which a rotation shaft or the like to be inspected by torque detection device 1A rotates, that is, the circumferential direction of inner ring 2, outer ring 4 or the like shown in FIGS. 1 to 3. The two permanent magnets 9 and 10 are bonded to have their respective polarities opposite to each other. That is, it is preferable that two permanent magnets 9 and 10 are disposed such that one permanent magnet's N pole and the other permanent magnet's S pole are aligned in the circumferential direction of inner ring 2, outer ring 4 or the like. Thereby, in a magnetic field generated by magnetic target 8, a line of magnetic force having a component in the circumferential direction is formed from the N pole of permanent magnet 9 toward the S pole of permanent magnet 10.

Permanent magnets 9 and 10 used as magnetic target 8 are preferably any one selected from the group consisting of neodymium magnet, samarium cobalt magnet, alnico magnet, and ferrite magnet.

Magnetic sensor 7 is disposed such that, in a state in which no torque due to rotational displacement acts on inner ring 2 or the like, in particular, those portions of the two permanent magnets 9 and 10 which are bonded together (a boundary between permanent magnet 9 and permanent magnet 10 in FIG. 4) at least face magnetic sensor 7 in the radial direction. That is, a straight line portion extending in the vertical direction as a boundary between permanent magnet 9 and permanent magnet 10 in FIG. 4 faces magnetic sensor 7 in the vertical direction in FIG. 4, that is, the radial direction.

Magnetic sensor 7 can be any one selected from the group consisting of a magnetoresistive element (an MR sensor), a magnetic impedance element (an MI sensor), and a Hall element. Note, however, that it is more preferable to use as magnetic sensor 7 a Hall IC in which a Hall element and an electric circuit such as an amplifier circuit are integrated together, and this can reduce the number of retrofit circuits.

Further, magnetic sensor 7 preferably has a programming function, and this facilitates setting output voltage. Furthermore, magnetic sensor 7 having a programming function can correct an output from magnetic sensor 7 in linearity and sensitivity.

Further, as magnetic sensor 7, a sensor having a temperature compensation circuit may be used. This enables temperature compensation without an external circuit.

Figure 5:
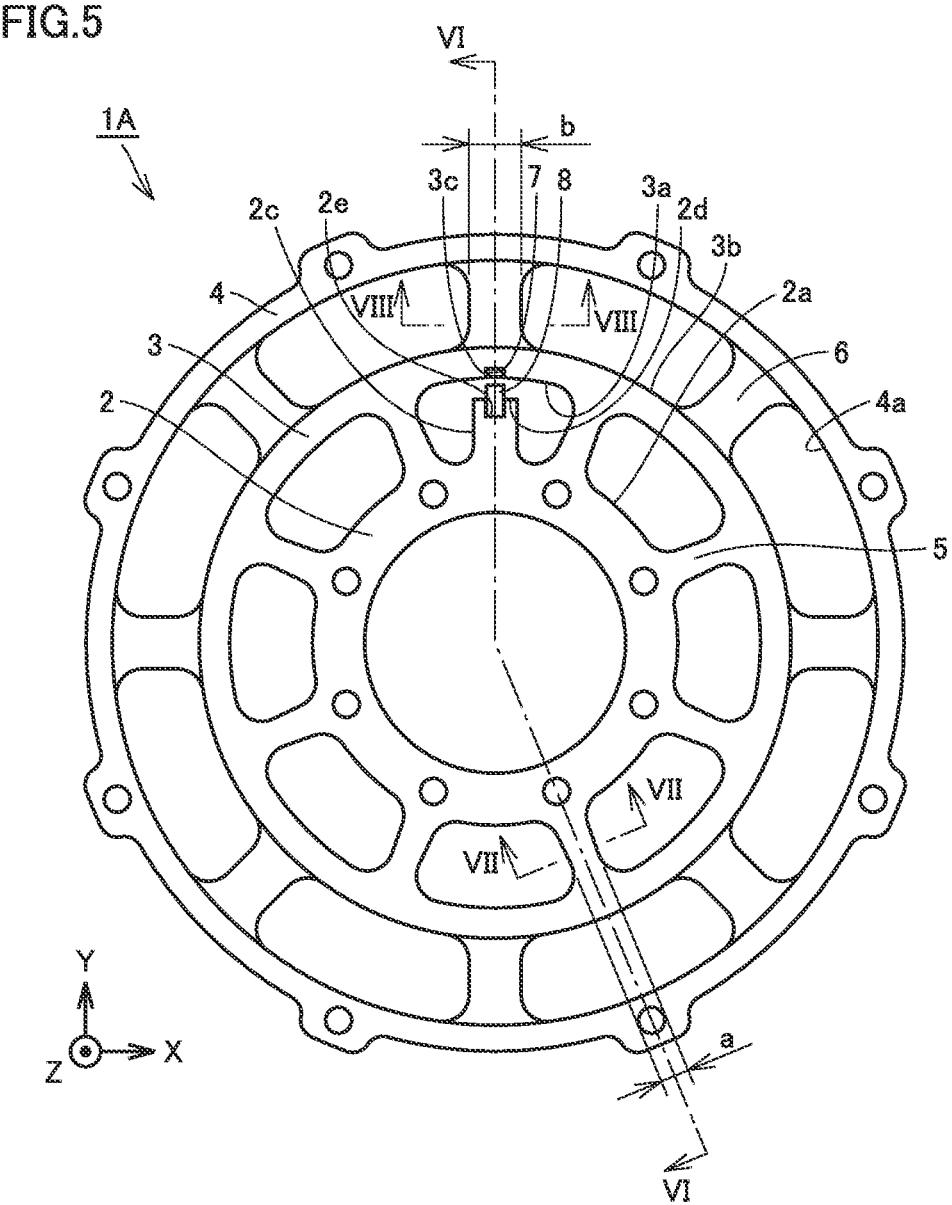
FIG. 5 is a schematic plan view for indicating the dimensions of the portions of first and second beams shown in FIG. 1 in a widthwise direction intersecting the directions in which the beams extend, in particular.
Figure 6:
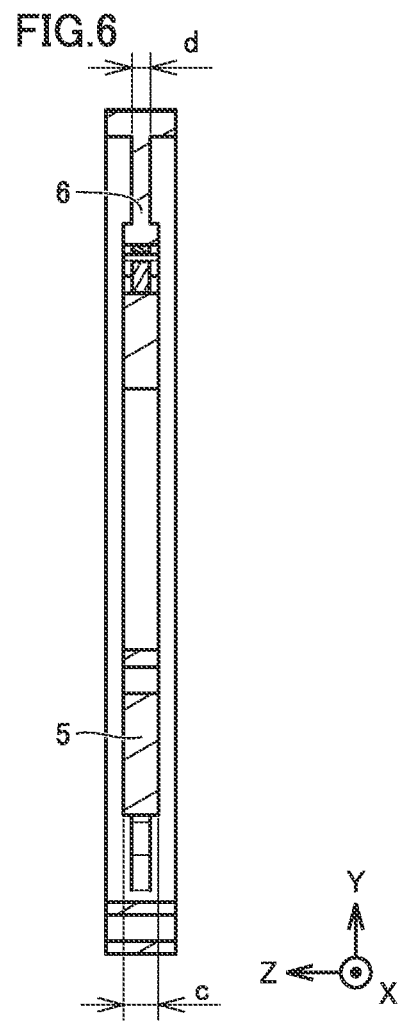
FIG. 6 is a schematic cross section of a portion along a line VI-VI indicated in FIG. 5.
Figure 7:
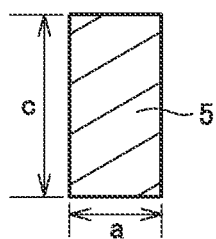
FIG. 7 is a schematic cross section of a portion along a line VII-VII indicated in FIG. 5.
Figure 8:
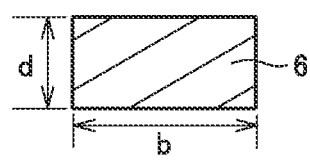
FIG. 8 is a schematic cross section of a portion along a line VIII-VIII indicated in FIG. 5.

FIG. 5 is a schematic plan view for indicating the dimensions of the portions of first and second beams 5 and 6 shown in FIG. 1 in a widthwise direction intersecting the directions in which the beams extend, in particular. FIG. 6 is a schematic plan view for indicating the thickness-wise dimensions of first and second beams 5 and 6, in particular, shown in FIG. 2, that is, the dimensions thereof in a direction perpendicular to the plane of the sheet of FIG. 5. FIG. 7 is a schematic cross section of first beam 5 in a direction intersecting a direction in which first beam 5 extends, and FIG. 8 is a schematic cross section of second beam 6 in a direction intersecting a direction in which second beam 6 extends.

Referring to FIG. 5, a dimension a of first beam 5 in a widthwise direction (a direction along the circumferential direction) intersecting a direction in which first beam 5 extends is different from a dimension b of second beam 6 in a widthwise direction (a direction along the circumferential direction) intersecting a direction in which second beam 6 extends. In torque detection device 1A, dimension b is larger than dimension a. More specifically, dimension b is preferably 1.2 times or more and 2 times or less, more preferably 1.5 times or more and 1.8 times or less of dimension a. Referring to FIG. 6, a dimension c of first beam 5 in a thickness-wise direction (a horizontal direction in FIG. 6 and a direction perpendicular to the plane of the sheet of FIG. 5) intersecting the dimension of first beam 5 in the widthwise direction is different from a dimension d of second beam 6 in a thickness-wise direction (the horizontal direction in FIG. 6 and the direction perpendicular to the plane of the sheet of FIG. 5) intersecting the dimension of second beam 6 in the widthwise direction. In torque detection device 1A, dimension c is larger than dimension d. More specifically, dimension c is preferably 1.2 times or more and 2 times or less, more preferably 1.5 times or more and 1.8 times or less of dimension d.

Although not shown in the figure, first and second beams 5 and 6 may have their respective dimensions (or lengths) determined, as desired, in a radial direction intersecting both the thickness-wise direction and the widthwise direction (i.e., a direction extending radially outward from the center of the circle of inner ring 2 or the like). As an example, in FIGS. 5 and 6, first and second beams 5 and 6 are dimensionally equal in this direction.

Thus, first beam 5 is larger in dimension in one direction (herein, the thickness-wise direction) than second beam 6, and smaller in dimension in another direction (herein, the widthwise direction) intersecting the one direction than second beam 6. As a result, as shown in FIGS. 7 and 8, a cross section of first beam 5 in a direction intersecting the direction in which first beam 5 extends (as shown in FIG. 7) and a cross section of second beam 6 in a direction intersecting the direction in which second beam 6 extends (as shown in FIG. 8) present shapes different from each other, and, in particular, they are non-similar shapes. That is, when the cross section of first beam 5 in the direction intersecting the direction in which first beam 5 extends and the cross section of second beam 6 in the direction intersecting the direction in which second beam 6 extends are both rectangular for example, their vertical and horizontal dimensional ratios are different from each other. The horizontal dimension in FIG. 7 represents width a of first beam 5 in FIG. 5, and the vertical dimension in FIG. 7 represents thickness c of first beam 5. The horizontal dimension in FIG. 8 represents width b of second beam 6 in FIG. 5, and the vertical dimension in FIG. 8 represents thickness d of second beam 6.

Hereinafter, a function and effect of torque detection device 1A having the above configuration will be described.

In torque detection device 1A, for example, a rotation shaft for example of a motor fixed to inner ring 2 and an annular object fixed to outer ring 4 and rotating for example using the motor's rotational force rotate. As these rotate, torque acts between inner ring 2 and outer ring 4. As a result, first beam 5 coupling inner ring 2 and middle ring 3 and second beam 6 coupling middle ring 3 and outer ring 4 deform, and rotational displacement occurs. Due to this rotational displacement, an amount of magnetism transmitted from permanent magnets 9 and 10 of magnetic target 8 to magnetic sensor 7 and sensed by magnetic sensor 7 changes. Torque is calculated from an amount by which the amount of magnetism sensed by magnetic sensor 7 changes. That is, torque detection device 1A only calculates torque from how an amount of magnetism is changed by rotational displacement. This allows torque to be calculated through a simpler process than a device in which how the electrical resistance values of a plurality of gauges laid on a beam change is calculated from the beam's rotational displacement and hence expansion and contraction, a sensor output voltage signal is calculated therefrom, and torque is further calculated therefrom. That is, torque detection device 1A allows a processing circuit for calculating the torque to be simplified.

Furthermore, in the present embodiment, a cross section of first beam 5 in a direction intersecting a radial direction in which first beam 5 extends (see FIG. 7) and a cross section of second beam 6 in a direction intersecting a radial direction in which second beam 6 extends (see FIG. 8) present shapes which are not similar to each other. Specifically, first beam 5 is larger in dimension in one direction (herein, the thickness-wise direction) than second beam 6, and smaller in dimension in another direction (herein, the widthwise direction) intersecting the one direction than second beam 6.

Thus designing a dimension of first beam 5 and that of second beam 6 in each direction allows first and second beams 5 and 6 to be configured to be easily deformable in response to torque acting in different directions, respectively. That is, one of first and second beams 5 and 6 is smaller in rigidity than the other of first and second beams 5 and 6 in a direction in which an amount of magnetism is sensed, and larger in rigidity than the other of first and second beams 5 and 6 in a direction other than the direction in which the amount of magnetism is sensed. Specifically, first beam 5 has a smaller dimension in the widthwise direction than second beam 6. The widthwise direction corresponds to a direction along the circumferential direction and is along a direction in which inner ring 2 and outer ring 4 are rotated about the Z axis. Therefore, in torque detection device 1A, first beam 5 is less rigid and more rotatable than second beam 6 for rotational torque acting about the Z axis. On the other hand, first beam 5 has a larger dimension in the thickness-wise direction than second beam 6. The thickness-wise direction is along a direction in which inner ring 2 and outer ring 4 are rotated about the X and Y axes. Therefore, in torque detection device 1A, first beam 5 is more rigid and less rotatable than second beam 6 for rotational torque acting about the X and Y axes.

In torque detection device 1A, magnetic target 8 is provided to inner ring 2 and magnetic sensor 7 is provided to middle ring 3. Accordingly, torque detection device 1A only detects torque corresponding to rotational displacement of inner ring 2 and does not detect torque corresponding to rotational displacement of outer ring 4. As rotational displacement is caused by rotation of a rotation shaft of a motor or the like that extends along the Z axis, it is necessary to measure rotational torque of inner ring 2 about the Z axis. In this measurement, rotational torque corresponding to displacement of inner ring 2 about the X and Y axes is noise, and accordingly, it is desirable to remove it.

In torque detection device 1A, as has been described above, first beam 5 coupled to inner ring 2 is smaller in rigidity than second beam 6 that is not directly coupled to inner ring 2 in a direction in which torque is detected (i.e., a direction of rotation about the Z axis), and larger in rigidity than second beam 6 in a direction other than the direction in which torque is detected (i.e., a direction of rotation about the X and Y axes). For example, when torque about the X or Y axis is applied, second beam 6 having lower rigidity for the torque in this direction significantly deforms, which can reduce an effect on deformation of first beam 5. On the other hand, when torque about the Z axis is applied, first beam 5 having lower rigidity for the torque in this direction significantly deforms. Thus, in torque detection device 1A, even if complex torque about a plurality of directions is applied, at first beam 5, only rotational displacement about the Z axis increases and those about the X and Y axes are reduced. This allows rotational displacement of inner ring 2 about the Z axis, as wanted, to be detected with high accuracy, and can reduce an unwanted effect of rotational displacement of inner ring 2 about the X and Y axes.

Thus, according to the present embodiment, a simple processing circuit and a simple configuration can be used to detect torque in a direction about a rotation axis, as necessary, with high accuracy. A function and effect of a member of inner and outer rings 2 and 4 other than that desired to reduce detection of rotational displacement other than that about the Z axis is implemented by a configuration having three ring members including middle ring 3.

Referring to FIG. 4 again, a magnetic flux generated by permanent magnets 9 and 10 is indicated by a plurality of arrows, and the direction of the arrows indicates the direction of the magnetic flux and the density of the arrows indicates the density of the magnetic flux. In the vicinity of a portion of the magnetic sensor that faces those portions of the two permanent magnets 9 and 10 which are bonded together, a high-density magnetic flux having portions adjacent to each other and opposite in direction is generated. That is, the magnetic flux is inverted in direction at a location that faces the bonded portions of the two permanent magnets 9 and 10. Thus, in a region facing permanent magnet 9 the magnetic flux is downward in the figure, whereas in a region facing permanent magnet 10 the magnetic flux is upward in the figure. The magnetic flux penetrates magnetic sensor 7, and magnetic sensor 7 senses the magnetic flux penetrating magnetic sensor 7 as an amount of magnetism.

However, when inner ring 2 has rotational displacement about the Z axis and accordingly, a relative positional relationship between magnetic target 8 and magnetic sensor 7 only slightly changes, then, in response, the amount of magnetism sensed by magnetic sensor 7 rapidly changes accordingly. In particular, the magnetic flux is significantly changed in direction at the location facing the bonded portions of permanent magnets 9 and 10, and when magnetic sensor 7 is provided at this location, the amount of magnetism changes particularly significantly in response to slight positional change. Accordingly, when magnetic sensor 7 is positioned to face the bonded portions of permanent magnets 9 and 10 (in a state without any rotational displacement), in particular, despite only a slight displacement of magnetic target 8 and magnetic sensor 7 in the circumferential direction, an amount of magnetism attributed to rotational displacement can be detected accurately and torque can be calculated from the amount of magnetism sensed.

Thus, in the present embodiment, a positional relationship between magnetic target 8 and magnetic sensor 7 changes in response to torque applied, and an amount of magnetism sensed by magnetic sensor 7 changes. From the amount by which the amount of magnetism sensed by magnetic sensor 7 changes, torque applied to torque detection device 10 is calculated.

As has been described above, the amount by which the amount of magnetism sensed by magnetic sensor 7 changes is sensed from magnetic sensor 7 as a voltage. Accordingly, the voltage output from magnetic sensor 7 can be regarded as the amount by which the amount of magnetism sensed by magnetic sensor 7 changes.

The value of torque of torque detection device 10 is calculated based on a relationship between previously known torque and an amount by which an amount of magnetism changes. The relationship between torque and the amount by which the amount of magnetism changes is obtained, for example, through a test. That is, previously known torque is applied to torque detection device 10, and the amount by which the amount of magnetism changes at that time is measured. Thereby, for example, a torque calculation table as shown in FIG. 9 can be created.

Figure 9:
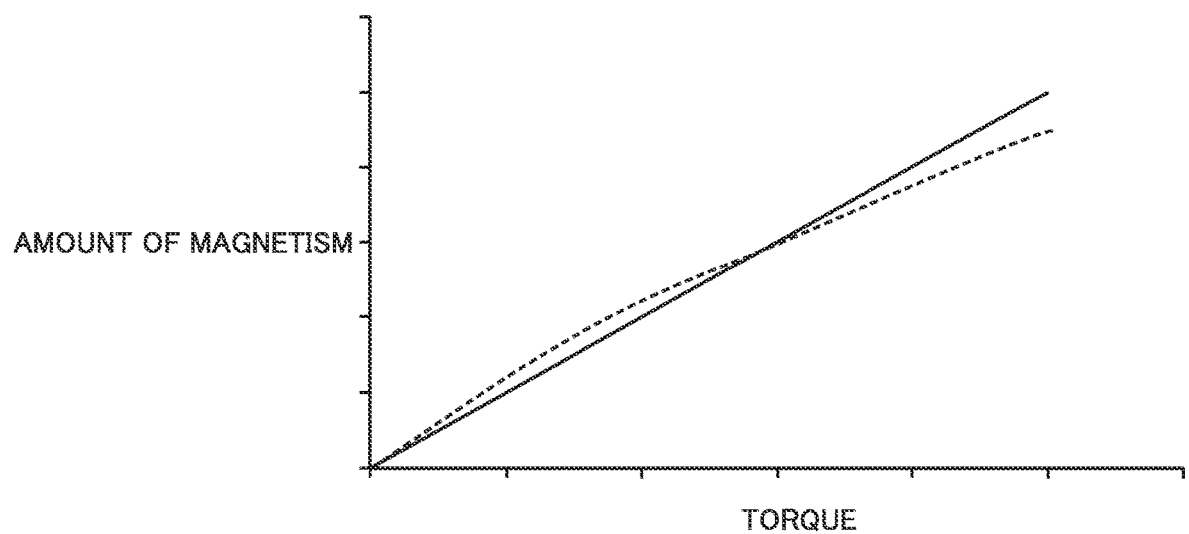
FIG. 9 is a graph representing a relationship between previously known torque and an amount by which an amount of magnetism changes.

The graph of FIG. 9 represents a relationship between previously known torque and the amount by which the amount of magnetism changes. In FIG. 9, the horizontal axis represents torque applied and the vertical axis represents the amount by which the amount of magnetism changes when the torque is applied. Referring to FIG. 9, it is preferable that a Hall IC or the like is used for magnetic sensor 7 and that the Hall IC has a programming function as described above. In this way, torque applied to torque detection device 10 can be calculated from the voltage output from magnetic sensor 7.

If the torque applied to torque detection device 10 and the amount by which the amount of magnetism changes have a linear relationship for example as represented in FIG. 9 by a solid line, the torque applied to torque detection device 10 can accurately be calculated as it is. However, if the torque applied to torque detection device 10 and the amount by which the amount of magnetism changes have a non-linear relationship for example as represented in FIG. 9 by a dotted line, then, the torque applied to torque detection device 10 cannot be accurately calculated as it is. Accordingly, preferably, a plurality of values (a plurality of coordinate points representable in a graph although not shown in FIG. 9) from the relationship between the torque and the amount by which the amount of magnetism changes in the above non-linear data are used to obtain a corrected, straight line. The corrected, straight line allows torque to be calculated with high accuracy.

Note that a member located on the back side (the opposite side in the radial direction) of magnetic sensor 7 as viewed from magnetic target 8 is more preferably formed of a ferromagnetic material such as an iron-based material. This can effectively enhance in density the magnetic flux penetrating magnetic sensor 7.

In addition, in torque detection device 1A, it is preferable that inner ring 2, middle ring 3, outer ring 4, first beam 5 and second beam 6 are integrally formed. This allows each member to be formed through a simpler process and can thus achieve a reduced manufacturing cost. Whether the members may be integrally formed as described above or separately formed, at least first and second beams 5 and 6 are composed of elastic members. Thereby, even after a rotational part is added, releasing this can return the members to their initial positions.

Second Embodiment

Figure 10:
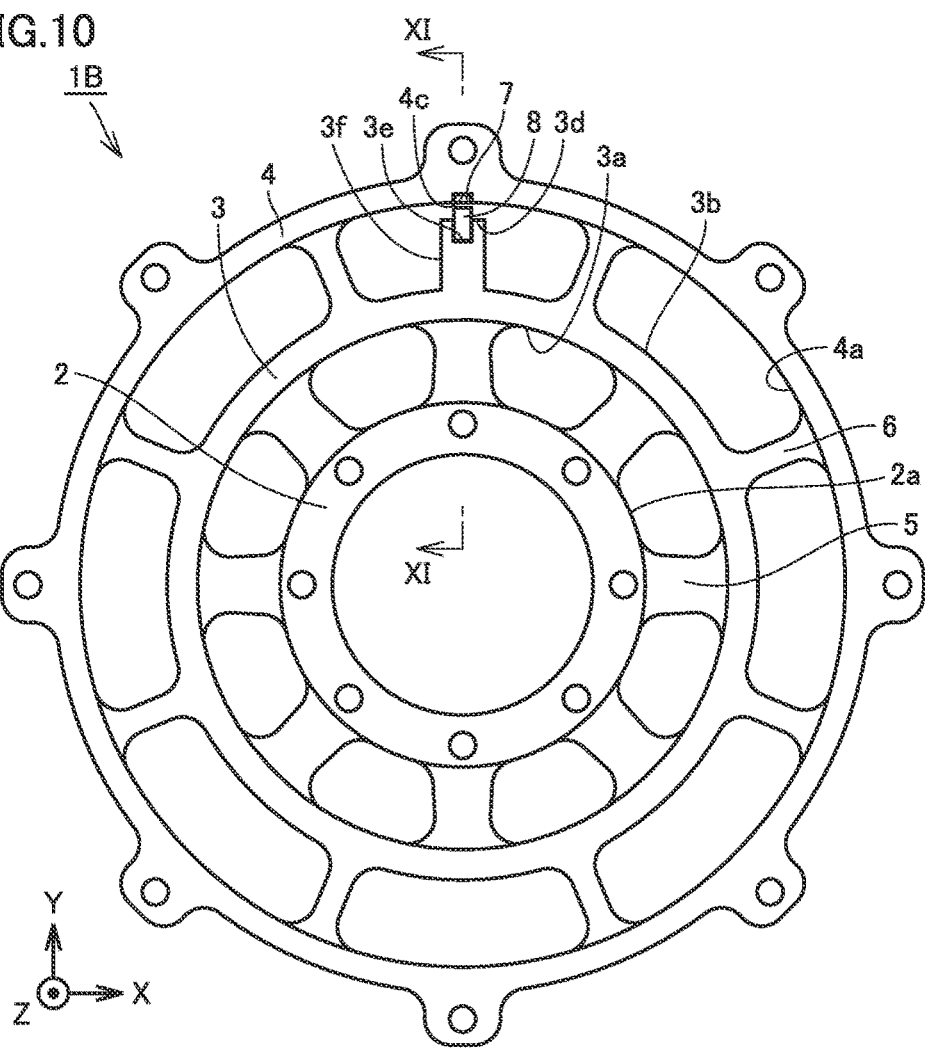
FIG. 10 is a schematic plan view showing a torque detection device according to a second embodiment.
Figure 11:
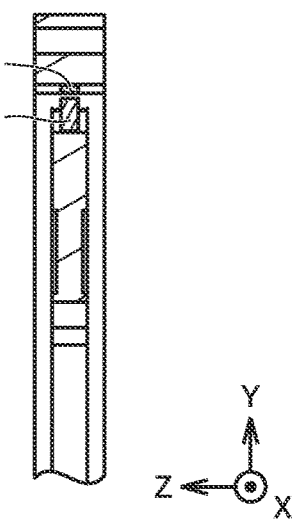
FIG. 11 is a schematic cross section of a portion along a line XI-XI indicated in FIG. 10.

FIG. 10 is a schematic plan view of a torque detection device according to the present embodiment. FIG. 11 is a schematic cross section of a portion along a line XI-XI indicated in FIG. 10. Referring to FIGS. 10 and 11, a torque detection device 1B of the present embodiment has basically the same configuration as torque detection device 1A. Accordingly, identical components are identically denoted and will not be described redundantly. Note that torque detection device 1B is different in where magnetic target 8 and magnetic sensor 7 are disposed.

Magnetic target 8 in FIGS. 10 and 11 is fixed to middle ring 3. More specifically, middle ring 3 has a protrusion 3f formed at a portion of radially outer surface 3b of middle ring 3 toward a radially outer side. Protrusion 3f is formed on one radially outer surface 3b of radially outer surfaces 3b divided into eight sections in the circumferential direction by eight second beams 6, for example. A flat surface recess 3e is further formed on a surface of a tip of protrusion 3f, that is, a flat surface on the radially outermost side thereof, i.e., a flat tip surface 3d. Flat surface recess 3e is formed toward a radially inner side. Magnetic target 8 is disposed so as to be fixed to flat surface recess 3e.

Magnetic sensor 7 is fixed to outer ring 4 in FIGS. 10 and 11. More specifically, outer ring 4 has a recess 4c formed at a portion of radially inner surface 4a of outer ring 4 toward a radially outer side. Magnetic sensor 7 is disposed so as to be fixed to recess 4c. Magnetic sensor 7 is directly fixed to recess 4c. Note that magnetic sensor 7 may be mounted on a printed circuit board (not shown), and the printed circuit board may be fixed on a flat surface (not shown) provided on a portion of a surface of radially inner surface 4a.

Torque detection device 1B having the above-described configuration calculates torque acting on outer ring 4 according to an amount of magnetism sensed by magnetic sensor 7.

Figure 12:
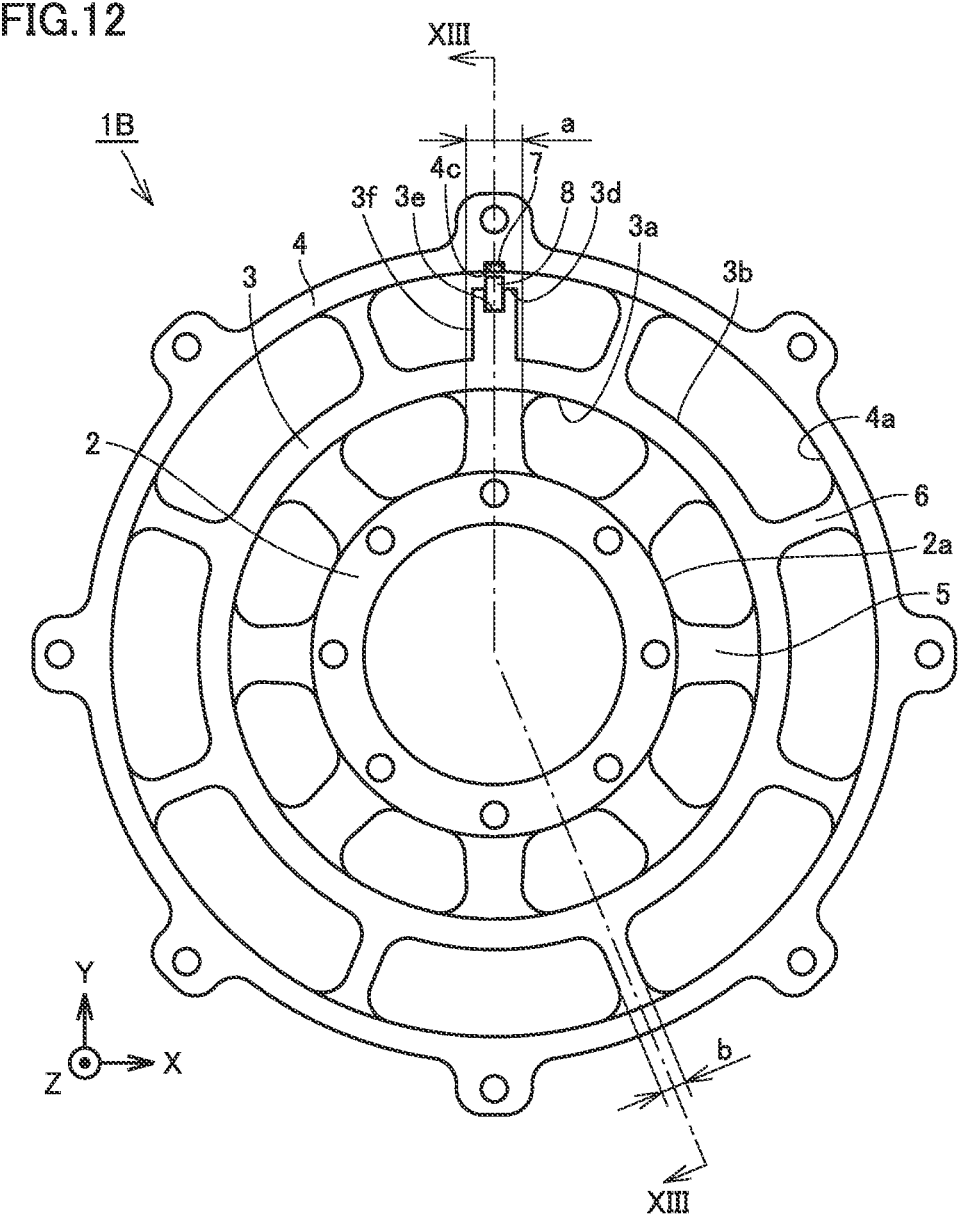
FIG. 12 is a schematic plan view for indicating the dimensions of the portions of the first and second beams shown in FIG. 1 in a widthwise direction intersecting the directions in which the beams extend, in particular.
Figure 13:
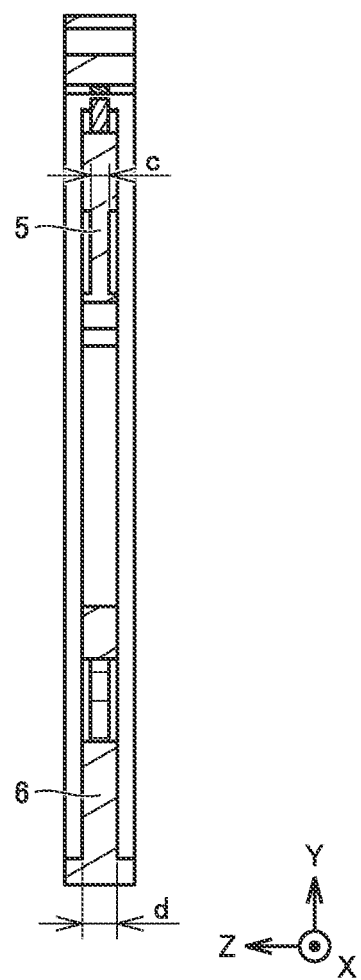
FIG. 13 is a schematic cross section of a portion along a line XIII-XIII indicated in FIG. 12.

FIG. 12 is a schematic plan view for indicating the dimensions of the portions of first and second beams 5 and 6 shown in FIG. 10 in a widthwise direction intersecting the directions in which the beams extend, in particular. FIG. 13 is a schematic plan view for indicating the thickness-wise dimensions of first and second beams 5 and 6, in particular, shown in FIG. 11, that is, the dimensions thereof in a direction perpendicular to the plane of the sheet of FIG. 12.

Referring to FIG. 12, in torque detection device 1B of the present embodiment, dimension a of first beam 5 in the widthwise direction intersecting the direction in which first beam 5 extends is larger than dimension b of second beam 6 in the widthwise direction intersecting the direction in which second beam 6 extends. More specifically, dimension a is preferably 1.2 times or more and 2 times or less, more preferably 1.5 times or more and 1.8 times or less of dimension b. Further, referring to FIG. 13, in torque detection device 1B of the present embodiment, dimension d of second beam 6 in a thickness-wise direction intersecting the dimension of second beam 6 in the widthwise direction is larger than dimension c of first beam 5 in the thickness-wise direction intersecting the dimension of first beam 5 in the widthwise direction. More specifically, dimension d is preferably 1.2 times or more and 2 times or less, more preferably 1.5 times or more and 1.8 times or less of the dimension c.

Thus, first beam 5 is larger in dimension in one direction (herein, the widthwise direction) than second beam 6, and smaller in dimension in another direction (herein, the thickness-wise direction) intersecting the one direction than second beam 6.

Torque detection device 1B having the above configuration is basically similar in function and effect to torque detection device 1A, and accordingly, the identical function and effect will not be described redundantly. That is, one of first and second beams 5 and 6 is smaller in rigidity than the other of first and second beams 5 and 6 in a direction in which torque is detected, and larger in rigidity than the other of first and second beams 5 and 6 in a direction other than the direction in which torque is detected. Note, however, that herein, specifically, second beam 6 has a smaller dimension in the widthwise direction than first beam 5. Therefore, in torque detection device 1B, second beam 6 is less rigid and more rotatable than first beam 5 for rotational torque acting about the Z axis. On the other hand, second beam 6 has a larger dimension in the thickness-wise direction than first beam 5. Therefore, in torque detection device 1B, second beam 6 is more rigid and less rotatable than first beam 5 for rotational torque acting about the X and Y axes.

In torque detection device 1B, magnetic target 8 is provided to middle ring 3 and magnetic sensor 7 is provided to outer ring 4. Accordingly, torque detection device 1B only detects torque corresponding to rotational displacement of outer ring 4 with respect to middle ring 3 and does not detect torque attributed to rotational displacement of inner ring 2 with respect to middle ring 3. Thus, second beam 6 coupled to outer ring 4 is smaller in rigidity than first beam 5 that is not coupled to outer ring 4 in a direction in which torque is detected (i.e., a direction of rotation about the Z axis), and larger in rigidity than first beam 5 in a direction other than the direction in which torque is detected (i.e., a direction of rotation about the X and Y axes). Accordingly, by a theory similar to that in the first embodiment, in torque detection device 1B, even if complex torque about a plurality of directions is applied, at second beam 6, only the rotational displacement about the Z axis increases and those about the X and Y axes are reduced. This allows the rotational displacement of outer ring 4 about the Z axis, as wanted, to be detected with high accuracy, and can reduce unwanted detection of rotational displacement of outer ring 4 about the X and Y axes and unwanted detection of rotational displacement of inner ring 2 about the Z axis.

Third Embodiment

Figure 14:
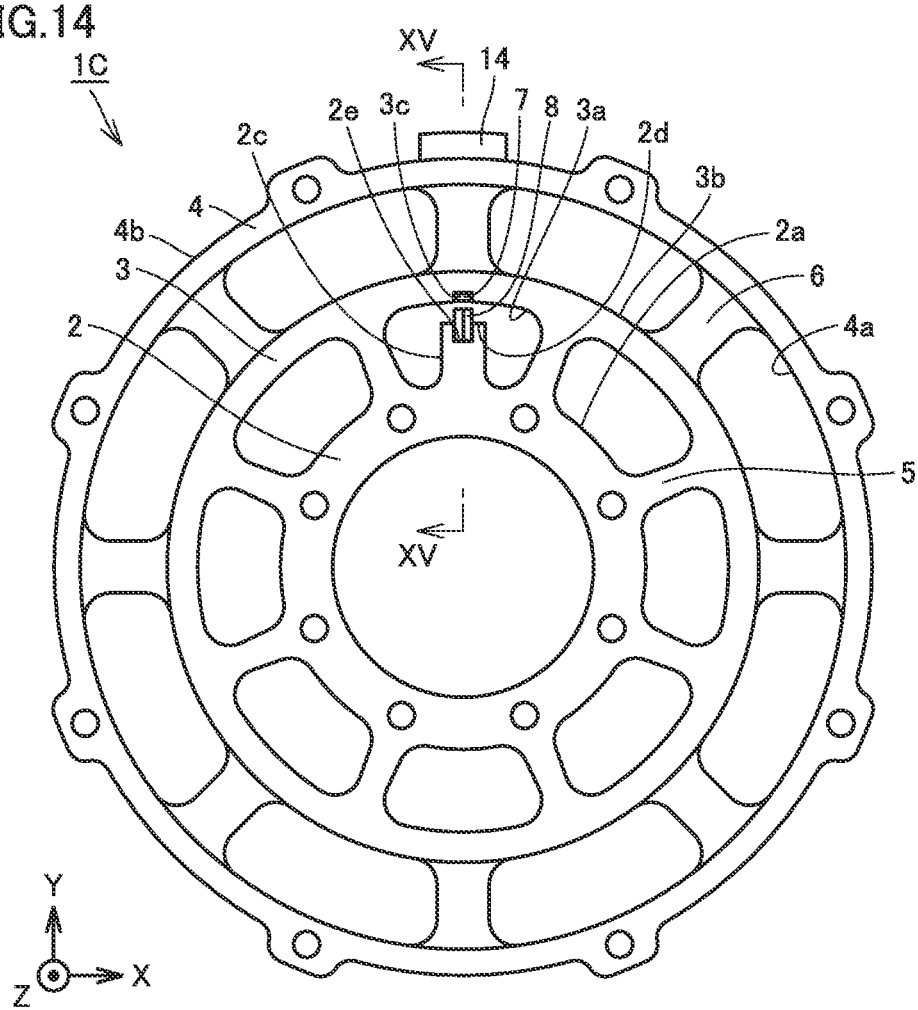
FIG. 14 is a schematic plan view of a torque detection device according to a third embodiment.
Figure 15:
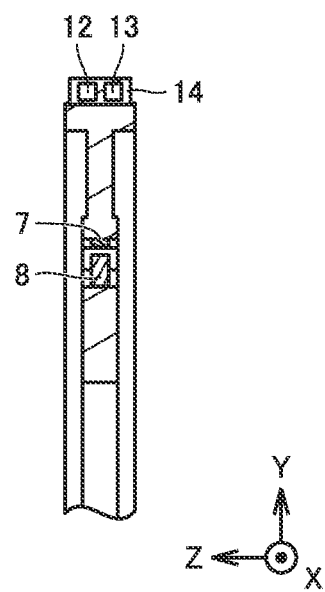
FIG. 15 is a schematic cross section of a portion along a line XV-XV indicated in FIG. 14.

FIG. 14 is a schematic plan view of a torque detection device according to the present embodiment. FIG. 15 is a schematic cross section of a portion along a line XV-XV indicated in FIG. 14. Referring to FIGS. 14 and 15, a torque detection device 1C of the present embodiment has basically the same configuration as torque detection device 1A. Accordingly, identical components are identically denoted and will not be described redundantly. Note, however, that torque detection device 1C corresponds to torque detection device 1A plus a signal processing unit 14 including a power supply unit 12 and a transmission unit 13 that transmits a torque signal indicative of how an amount of magnetism obtained from magnetic sensor 7 changes. Signal processing unit 14 is provided for calculating torque according to an amount of magnetism sensed by magnetic sensor 7. Although not shown, torque detection device 1B may further include signal processing unit 14 having the above configuration.

Power supply unit 12 may be either a battery or a unit for self-power generation. While transmission unit 13 wirelessly transmits the torque signal obtained from magnetic sensor 7, transmission unit 13 may not do so wirelessly. In transmission unit 13, a central processing unit (CPU) that converts a signal of an amount of magnetism of magnetic sensor 7 into a torque value may be mounted. While signal processing unit 14 is fixed to radially outer surface 4b of outer ring 4, for example, it may alternatively be fixed to a different site.

By including signal processing unit 14 configured as described above, torque detection device 1C can process the signal of the amount of magnetism of magnetic sensor 7 more efficiently.

Fourth Embodiment

Figure 16:
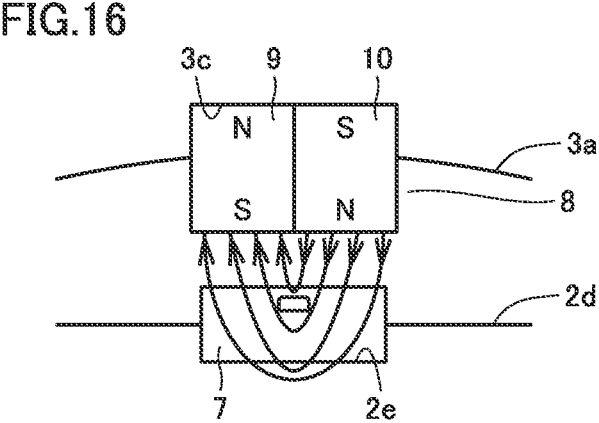
FIG. 16 is a schematic diagram illustrating in more detail another example of the configuration of the portion of magnetic target 8 and magnetic sensor 7 of a torque detection device according to a fourth embodiment, that is different than FIG. 4.

In each of the torque detection devices of the above embodiments, magnetic target 8 is fixed to a member disposed on a side radially inner than magnetic sensor 7. However, in any of the torque detection devices of the embodiments described above, magnetic target 8 may be fixed to a member disposed on a side radially outer than magnetic sensor 7. Specifically, referring to FIG. 16, for example, this configuration is basically the same as the configuration shown in FIG. 4, and accordingly, identical components will not be described redundantly. Note, however, that, as shown in FIG. 16, for example, in torque detection device 1A of FIG. 1, magnetic target 8 may be fixed to middle ring 3 and magnetic sensor 7 may be fixed to inner ring 2. Furthermore, although not shown, for example, in torque detection device 1B of FIG. 10, magnetic target 8 may be fixed to outer ring 4 and magnetic sensor 7 may be fixed to middle ring 3. Such a configuration in which magnetic target 8 is disposed on a side radially outer than magnetic sensor 7 may be applied to torque detection device 1C of FIG. 14. When all of the embodiments are summarized, magnetic target 8 is fixed to one of inner and middle rings 2 and 3 or one of middle and outer rings 3 and 4. Magnetic sensor 7 for sensing a magnetic field generated by magnetic target 8 is fixed to the other of inner and middle rings 2 and 3 or the other of middle and outer rings 3 and 4. Magnetic target 8 and magnetic sensor 7 face each other in the radial direction.

The present embodiment can provide a function and effect basically similar to those of the first to third embodiments.

In addition, what is described for the first embodiment is basically also applicable to the second to fourth embodiments. The features described in the embodiments described above may be combined together, as appropriate, within a technologically consistent range.

The embodiments disclosed herein should be considered as illustrative in any respect and not restrictive. The scope of the present invention is defined by the terms of the claims, rather than the above description, and is intended to include any modifications within the meaning and scope equivalent to the terms of the claims.

REFERENCE SIGNS LIST 1A, 1B, 1C torque detection device, 2 inner ring, 2a inner ring's radially outer surface, 2c inner ring's protrusion, 2d, 3d flat tip surface, 2e, 3e flat surface recess, 3 middle ring, 3a middle ring's radially inner surface, 3b middle ring's radially outer surface, 3c middle ring's recess, 3f middle ring's protrusion, 4 outer ring, 4a outer ring's radially inner surface, 4b outer ring's radially outer surface, 4c outer ring's recess, 5 first beam, 6 second beam, 7 magnetic sensor, 8 magnetic target, 9, 10 permanent magnet, 12 power supply unit, 13 transmission unit, 14 signal processing unit.

The invention claimed is:

1. A torque detection device comprising:
an inner ring;
a middle ring disposed on a side radially outer than the inner ring and spaced from the inner ring;
an outer ring disposed on a side radially outer than the middle ring and spaced from the middle ring;
a first beam composed of an elastic member extending in a radial direction so as to couple the inner ring and the middle ring together;
a second beam composed of an elastic member extending in a radial direction so as to couple the middle ring and the outer ring together;
a magnetic target fixed to one of the inner and middle rings or one of the middle and outer rings; and a magnetic sensor fixed to the other of the inner and middle rings or the other of the middle and outer rings to sense a magnetic field generated by the magnetic target, the magnetic target and the magnetic sensor facing each other, the torque detection device calculating torque acting on the inner ring or the outer ring according to how an amount of magnetism sensed by the magnetic sensor changes.

2. The torque detection device according to claim 1, wherein the magnetic target includes two permanent magnets disposed adjacent to each other, one and the other of the two permanent magnets are bonded together oppositely in polarity, and the magnetic target and the magnetic sensor face each other such that those portions of the two permanent magnets which are bonded together at least face the magnetic sensor.

3. The torque detection device according to claim 1, wherein a cross section of the first beam in a direction intersecting a direction in which the first beam extends and a cross section of the second beam in a direction intersecting a direction in which the second beam extends present shapes, respectively, which are not similar to each other.

4. The torque detection device according to claim 1, wherein one of the first and second beams is smaller in rigidity than the other of the first and second beams in a direction in which the amount of magnetism is sensed, and larger in rigidity than the other of the first and second beams in a direction other than the direction in which the amount of magnetism is sensed.

5. The torque detection device according to claim 1, wherein the inner ring, the middle ring, the outer ring, the first beam, and the second beam are integrally formed.

6. The torque detection device according to claim 1, further comprising a signal processing unit that calculates torque according to the amount of magnetism sensed by the magnetic sensor, the signal processing unit including a power supply unit and a transmission unit that transmits a torque signal obtained from the magnetic sensor.

* * * * *